United States Patent
Bi

(10) Patent No.: US 8,620,320 B2
(45) Date of Patent: Dec. 31, 2013

(54) METHODS FOR HANDING OVER CALLS BETWEEN COMMUNICATION NETWORKS USING DISSIMILAR AIR INTERFACES

(75) Inventor: Hao Bi, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1389 days.

(21) Appl. No.: 11/765,160

(22) Filed: Jun. 19, 2007

(65) Prior Publication Data

US 2008/0318574 A1   Dec. 25, 2008

(51) Int. Cl.
*H04W 36/00* (2009.01)

(52) U.S. Cl.
USPC ............ 455/436; 455/444; 455/439; 370/331

(58) Field of Classification Search
USPC .................. 455/436–444; 370/328, 331, 332
See application file for complete search history.

(56) References Cited

U.S. PATENT DOCUMENTS

| | | |
|---|---|---|
| 6,445,918 B1 | 9/2002 | Hellander |
| 7,876,729 B1 | 1/2011 | Grilli et al. |
| 2003/0108006 A1* | 6/2003 | Holcman et al. ............... 370/331 |
| 2004/0202301 A1* | 10/2004 | Elliott ....................... 379/201.02 |
| 2007/0019575 A1 | 1/2007 | Shaheen |
| 2007/0036109 A1 | 2/2007 | Kwak et al. |
| 2007/0086390 A1 | 4/2007 | Sinnarajah et al. |
| 2007/0086391 A1 | 4/2007 | Sinnarajah et al. |
| 2007/0086392 A1 | 4/2007 | Sinnarajah et al. |
| 2007/0086393 A1 | 4/2007 | Sinnarajah et al. |
| 2007/0091854 A1 | 4/2007 | Sinnarajah et al. |
| 2007/0213055 A1 | 9/2007 | Sundberg et al. |

FOREIGN PATENT DOCUMENTS

WO    2007011983 A1    1/2007

OTHER PUBLICATIONS

3GPP, Universal Mobile Telecommunications System(UMTS); Radio Resource Control (RRC); Protocol Specification (3GPP TS 25.331 version 7.4.0 Release 7), Mar. 2007.*
PCT Notification of Transmittal of the International Search Report and the Written Opinion of the International Searching Authority, or the Declaration, date of mailing Jul. 11, 2008, PCT/US2008/067292, pp. 1-17, European Patent Office, Munich.
3GPP, Universal Mobile Telecommunications System (UMTS); Radio Resource Control (RRC); Protocol specification (3GPP TS 25.331 version 7.4.0 Release 7), Mar. 2007, pp. 212-219 (XP-002500944).
IEEE 802.20 Working Group on Mobile Broadband Wireless Access, "QFDD Technology Overview Presentation (IEEE C802.20-05-59)", Qualcomm, Nov. 2005, 70 pages.

(Continued)

*Primary Examiner* — Marcos Torres
(74) *Attorney, Agent, or Firm* — Scott M. Garrett; Sylvia Chen

(57) ABSTRACT

A call in progress in a first communication network is handed over to a second communication network which uses a different air interface. To facilitate the handover, the present serving base station commands the mobile communication device to take measurements of surrounding cells of the second communication network. The measurements are sent along with a handover request from the serving base station to a radio network controller of the second network, which decides upon a cell to which the cal will be handed. A grant message including an identifier to be used by the mobile communication device and an identifier of the base station receiving the handover is transmitted back to the first network, and used by the mobile communication device in handing over the call.

16 Claims, 3 Drawing Sheets

(56) References Cited

OTHER PUBLICATIONS

IEEE 802.20 Working Group on Mobile Broadband Wireless Access, "MBFDD and MBTDD Wideband Mode: Technology Overview (IEEE C802.20-05/68r1)", Qualcomm, Jan. 2006, 109 pages.

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (3GPP TS 36.300 v8.0.0)", Mar. 2007, 82 pages.

3rd Generation Partnership Project 2, "cdma2000 High Rate Packet Data Air Interface Specification (3GPP2 C.S0024 Version 4.0)", Oct. 25, 2002, 548 pages.

Russian Patent and Trademark Office, "Decision on Grant of a Patent for Invention" for Russian Patent Application No. 2010101421, Aug. 20, 2012, 16 pages.

Third Generation Partnership Project and Nokia Siemens Networks et al., "E-UTRA Measurements and Cell Reselection Considerations", 3GPP TSG RAN WG2 Meeting #58 R2-071727, May 7-11, 2007, 4 pages.

* cited by examiner

METHODS FOR HANDING OVER CALLS BETWEEN COMMUNICATION NETWORKS USING DISSIMILAR AIR INTERFACES

FIELD OF THE INVENTION

The invention relates generally to mobile communication, and more particularly to inter-system handover of calls in progress.

BACKGROUND OF THE INVENTION

Mobile communication networks are in widespread use throughout metropolitan regions of the world, and have come to be common in many places. Over the years a variety of mobile communication services have been developed, including different radio air interfaces. Conventional mobile communication devices are designed for use with a particular air interface, but presently manufacturers are designing mobile communication devices that can access multiple communication networks having different air interfaces. Initial multi-mode mobile communication devices simply used dedicated hardware for different communication networks, and the device essentially had to be reset to switch over to a different air interface. Since then advances in integration have allowed manufacturers to design "all in one" mobile communication devices which can communicate over a variety of air interfaces, re-using circuitry for each of the air interfaces. Some of these devices were even "dual camp" designs which allowed the device to operate on two different communication networks at the same time.

On the other side of the air interface, the infrastructure and fixed equipment operated by communication service providers or operators, communication networks have been expanding and integrating as well. For one, most communication networks, in addition to conventional circuit mobile telephony, offer data services, including messaging and Internet access. Furthermore, communication network operators have been forming partnerships to support each others' subscribers, making it easy for users to roam from one system to another.

Presently, mobile circuit-switched voice communication is considered a mature technology. Much of the industry now is focusing on enhancing data communication, applications, and services. Efforts range from simply increasing data throughput to live voice and video streaming using Internet Protocol (IP) based communication. As a result there are a variety of competing mobile data service technologies available in the marketplace. Many of these technologies are standardized and specified by various standards organizations, such as, for example, the International Telecommunications Union (ITU). Standards are defined and published for present systems, but at the same time standards for future services as well as changes to existing services are also being undertaken in these organizations.

Two examples of data communication networks and protocols that are of interest in the industry, presently, are the Evolved Universal Terrestrial Radio Access Network (E-UTRAN), specified by the 3GPP group as 3GPP TS 36.300, and the Evolved Data Optimized (EV-DO) network specified as the cdma2000 High Rate Packet Data Air Interface Specification. Both of these specifications are well known in the art, and specify incompatible air interfaces. However, these systems can be connected on the network side of the air interface, potentially allowing inter-system call handover. However, even with data calls, considering there may be high quality of service (QoS) applications using the data call, minimizing handover delay is necessary to avoid packet loss. One way a data call could be handed over from one system to another would be for the mobile communication device to have two transceivers, one for each air interface. While a call or data session is being serviced on one, the other transceiver could be used to make arrangements with a base station of the other system to prepare for a handover. The dual transceiver approach, however, adds substantial cost the mobile communication device, as well as size and weight. Therefore there is a need for a method by which a call can be handed over from one communication network to a different communication network without incurring substantial delay.

SUMMARY OF THE INVENTION

The present invention discloses in one embodiment of the invention a method of performing call handover of a call in progress at a mobile communication device between networks having dissimilar air interface. From the perspective of the first communication network the method commences upon receiving from the mobile communication device at a base station of a first communication network a neighbor cell measurement. The neighbor cell measurement is performed by the mobile communication device on a neighbor cell belonging to the first communication network. The base station to which the mobile communication device is connected then determines that the neighbor cell measurement indicates handover to a second communication network is desirable. However, the second communication network uses a different air interface. The base station the commences transmitting to the mobile communication device a neighbor cell list including at least one neighbor cell of the second communication network. The mobile communication device undertakes the measurements by tuning away from the present serving base station to receive signals from the indicated neighbor cells of the second communication network. The mobile communication device also transmits its session profile, including session control and protocol parameters desired by the mobile communication device for the call, to the base station. The parameters indicate the resources needed to support the present call on the second communication network. Upon making the measurements on the base stations of the second communication network, the mobile communication device transmits the results to its present serving base station. The base station then commences a handover negotiation with a radio network controller of the second communications network. The radio network controller evaluates the information and decides whether the request can be supported given presently available resources. A counteroffer may be proposed by the radio network controller. Once the radio network controller decides upon a base station and communication parameters, the radio network controls formulates a handover grant message. The grant message includes a target base station identifier and connection parameters. The target base station identifier corresponds to the target base station of the second communication network to which the call will be handed. The radio network controller transmits grant message back to the base station of the first communication network presently handling the call. The grant information is then transmitted to the mobile communication device, which uses the target base station identifier to handover to the target base station of the second communication network according to the connection parameters.

From the radio network controller's perspective, the invention provides for a method of performing call handover from the first communication network to the second communication network, where the radio network controller is in the second communication network, and the two communication networks use different air interfaces. The method commences upon receiving a handover request at the radio network controller from a base station of the first communication network via a mobility management entity of the first communication network. The base station making the request is the base station presently servicing the call. The handover request includes at least one neighbor cell measurement performed by a mobile communication device on a base station of the second communication network, as well as a session profile. The session profile includes session control and protocol parameters used by the mobile communication device for the call. The radio network controller then commences selecting a base station of the second communication network to receive the handover based on the session profile and available resources of the second communication network. The radio network controller generates a grant message which includes an identifier to be used by the mobile communication device upon handover, a target base station identifier of a target base station of the second communication network which will receive the handover, and connection parameters to be used by the mobile communication device upon connecting to the base station of the second communication network. The radio network controller then transmits the grant message back to the requesting base station, which relays the information to the mobile communication device. The mobile communication device then uses the information to handover the call to the second communication network using the air interface of the second communication network.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
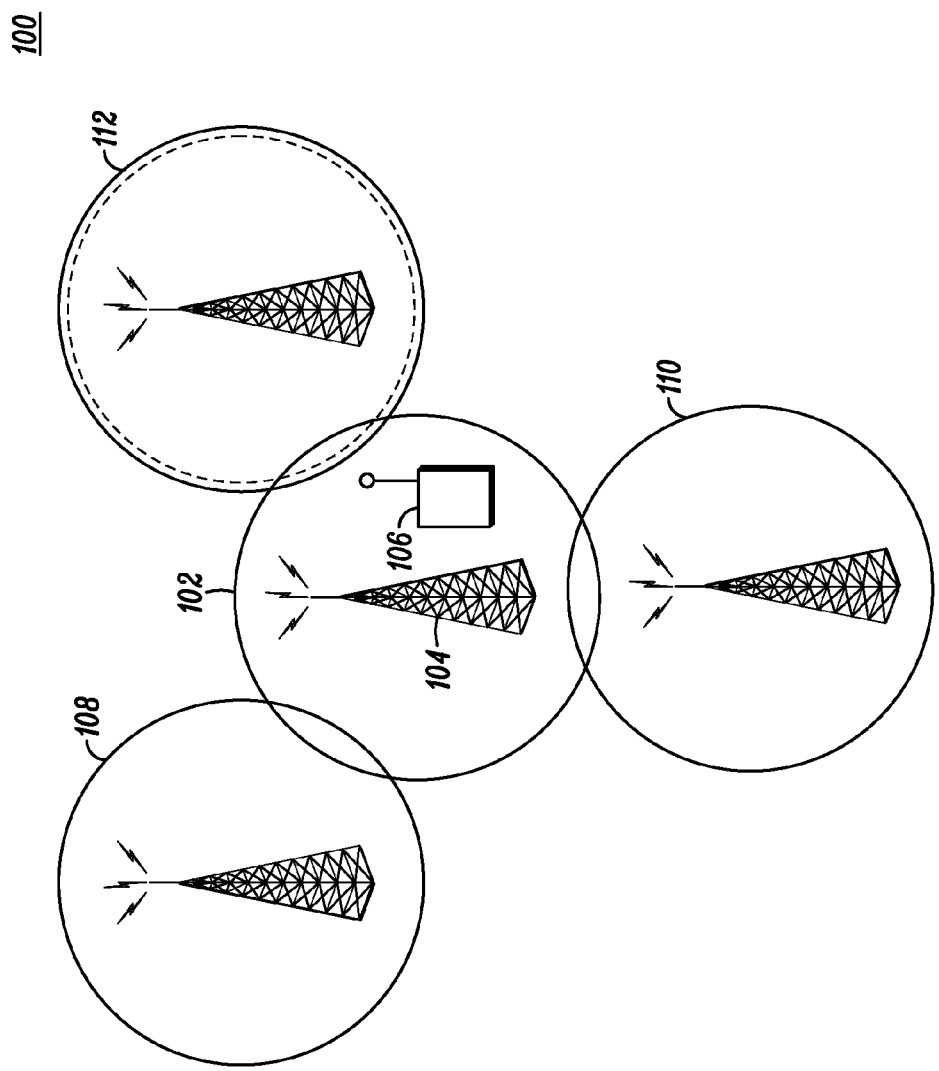
FIG. 1 shows a system diagram of two communication networks' serving cells where the two communication networks use differing air interfaces to facilitate wireless mobile communication for mobile communication devices.

Referring now to FIG. 1, there is shown a system diagram 100 of two communication networks' serving cells. A present serving cell 102 is operated by a base station 104, which facilitates an air interface according to a defined radio communications protocol in the vicinity of the base station, as is well know in the art. A mobile communication device 106 is designed and configured to operate according to the air interface so that it may engage in communication activity via the base station. The base station is part of a communication network which includes base stations and other fixed equipment. Neighbor cells 108, 110, which are part of the same communication network to which base station 104 belongs, and operate using the same air interface as used by base station 104. The mobile communication device 106 can travel from one cell to another through the region, with service for the mobile communication device being handed over from once cell to the next. The process of handover is well known, and generally involves the mobile communication device making measurements of the signals transmitted by neighbor cells, selecting a target cell from the neighbor cells based on the measurements, and then redirecting communication service in the communication network to the new serving cell while the mobile communication device retunes to the new cell frequency.

In addition to neighbor cells 108 and 110, another cell 112 also neighbors the present serving cell, but it is not part of the same communication network to which base station 104 belongs, as indicated by the dashed line bordering cell 112. Cell 112 further operates using an air interface that is substantially different that that of cells 102, 108, and 110. In one embodiment of the invention, cells 102, 108, and 110 may be operated according the "Evolved Universal Terrestrial Radio Access Network" (E-UTRAN) specification, and cell 112 may be operated in accordance with the "cdma2000 High Rate Packet Data Air Interface Specification," and communication activity being conducted is a data communication activity, such as, for example, voice over IP (VoIP) calling.

If the mobile communication device 106 is traveling in the direction of either cell 108 or 110, then service may routinely be handed over to the appropriate cell. However, if the mobile communication device is moving away from cells 102, 108, and 110 towards an area where the communication network to which those cell belong doe not support service but where service is provided by a second communication network operating cell 112, then it is beneficial to hand communication service over to cell 112. However, if the mobile communication device is solely responsible for contacting cell 112 to arrange for handover, the resulting interruption in service would not be acceptable. This assumes the mobile communication device uses a single transceiver and does not have the resources to communicate with both communication networks at the same time, which allows for a less expensive and smaller mobile communication device. The delay comes from the fact that the systems use different mobile identifiers, different channel structure, different session and protocol stack, and so on.

Figure 2:
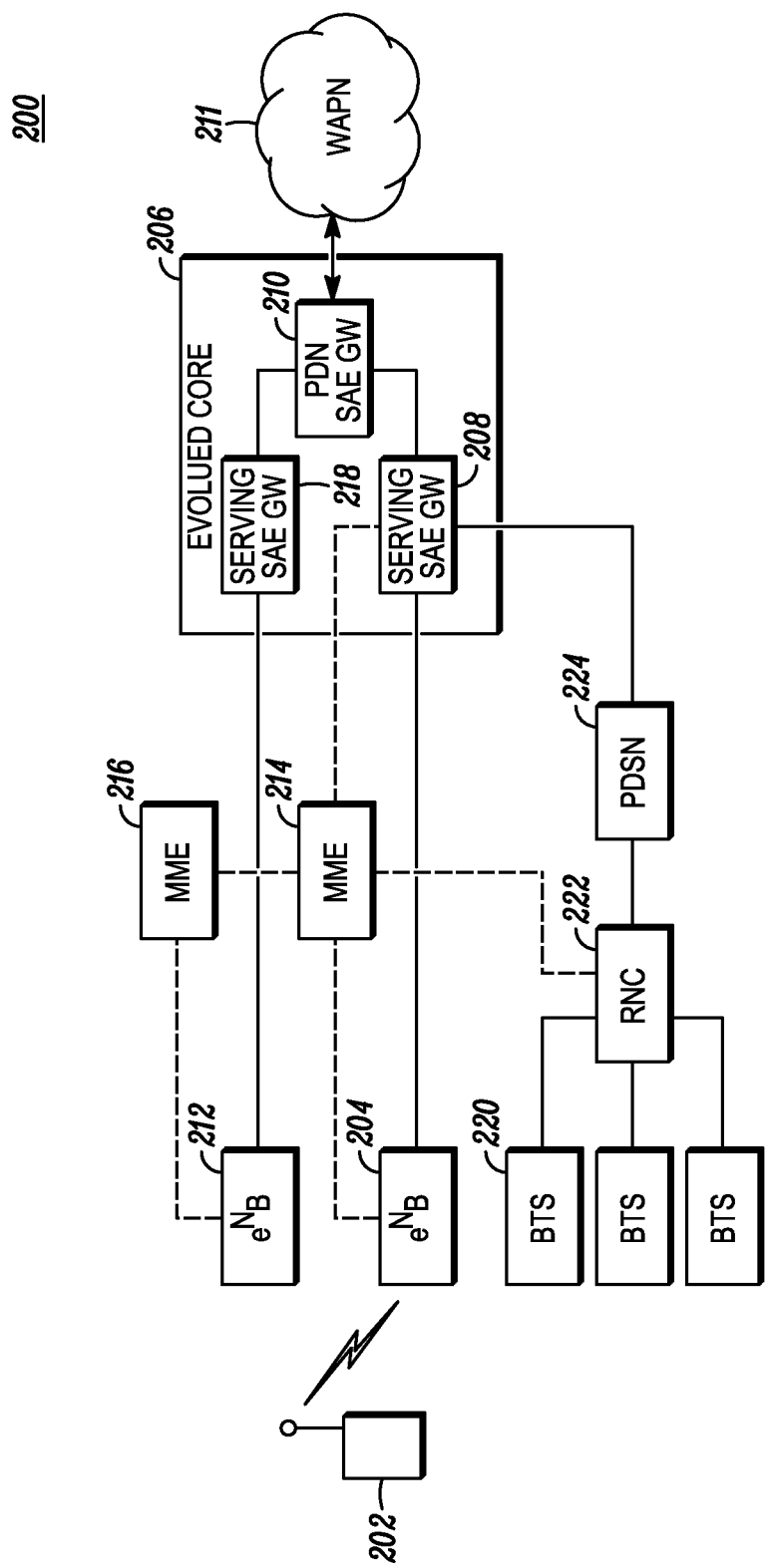
FIG. 2 shows a network architecture diagram of two communication networks operating in accordance with an embodiment of the invention.

Referring now to FIG. 2, there is shown a network architecture diagram 200 of two communication networks operating in accordance with an embodiment of the invention. A mobile communication device 202 is presently connected to a first communication network, such as one operated in accordance with the E-UTRAN specification. The mobile communication device 202 communicates with a base station 204, which may be a base station operated in accordance with E-UTRAN specification of "Evolved Node B," or simply "eNB." The base station 204 communicates with a core network 206, which may be an evolved core as specified by the E-UTRAN specification. In particular the base station is operably coupled to a serving system architecture evolution gateway (SAE GW) 208. The serving SAE GW facilitates communication between base stations and packet data network SAE gateway (PDN SAE GW). The PDN SAE GW facilitates packet data communication between the communication network and a wide area packet network 211.

The base station 204 may have a neighboring base station or neighbor cell established by base station 212. In the present example, the neighbor base station 212 is coupled to a different serving SAE GW 218. In some circumstances mobile communication device 202 may travel away from base station 204 and towards base station 212, prompting a handover from base station 204 to base station 212. This sort of intra-system handover is routine, and is facilitated by mobility management entities (MME) 214 and 216. As shown in the present example, each base station has a control link, as indicated by the dashed lines, to its respective MME. The MMEs facilitate signaling between the base stations to coordinate handovers, among other activities.

In the second communication network there are base stations such as base station 220, known as a base transceiver site (BTS). In the present example, the second network may be one operated and configured in accordance with the "cdma2000 High Rate Packet Data Air Interface Specification," referred to as evolution data optimized or EV-DO system. Thus, according to an embodiment of the invention, the first communication network is an E-UTRAN system and the second system is an EV-DO system. The base station of the second network is operably coupled to a radio network controller (RNC) 222 which facilitates mobility management and other resource management functions. The RNC is coupled to a packet data service node 224 which, in turn, is coupled to the serving SAE gateway 208, providing a common point between the two systems. A control link is established between the MME 214 and the RNC 222 which facilitates the inter-system handover in accordance with the invention.

According to the invention, as signal conditions deteriorate for the mobile communication device while operating in the first communication network, indicating a handover is desirable, and more specifically that handover to the second communication network is desirable due to a lack of suitable target cells in the first communication network, the present serving base station 204 communicates with the RNC 222 via the MME 214 to negotiate handover of the mobile communication device and call to a suitable base station of the second communication network.

Figure 3:
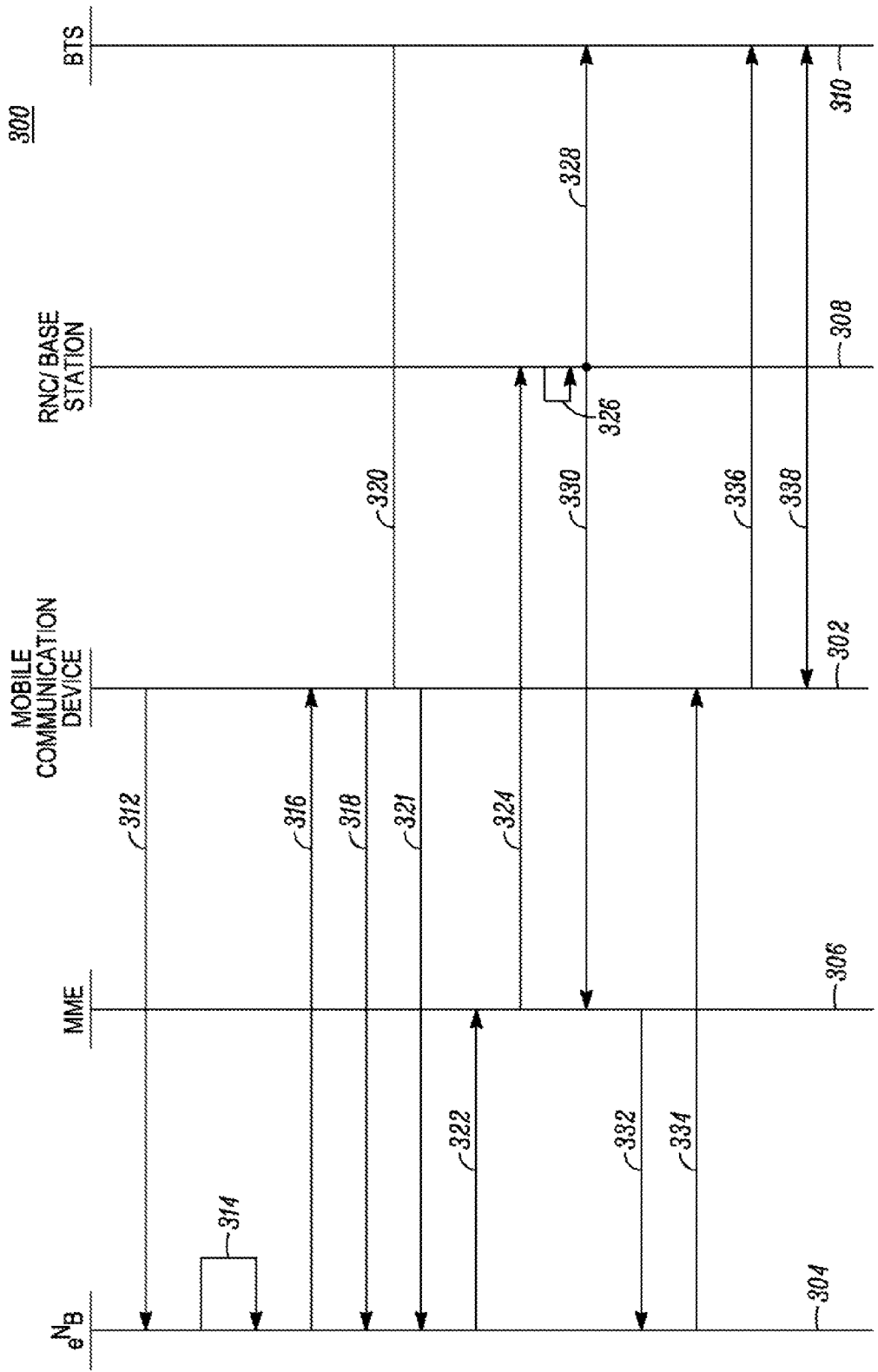
FIG. 3 shows a signal flow diagram of a method of performing call handover between communication networks having different air interfaces, in accordance with an embodiment of the invention.

Referring now to FIG. 3, there is shown a signal flow diagram 300 of a method of performing call handover between communication networks having different air interfaces, in accordance with an embodiment of the invention. In keeping with the examples discussed with respect to FIG. 2, the method as illustrated by FIG. 3 involves a handover from an E-UTRAN system to an EV-DO system of a data call being commenced by a mobile communication device. The invention facilitates such inter-system handover by facilitating acquisition of a unicast access terminal identifier (UATI) to be used by the mobile communication device with the target EV-DO system, perform session configuration, and connect with the target base station of the DO network on a dedicated traffic channel with a minimum of interruption. The diagram shows exemplary signal flow between a mobile communication device 302, eNB or base station of a first communication network 304, mobility management entity 306, radio network controller 308, and a target base station of a second communication network 310, such as a BTS of a DO network.

The present example commences with the mobile communication device involved in a data call in the first communication network. In the course of routine operation, the mobile communication device has received from the first communication network base station a neighbor cell list of intra-system neighbor cells adjacent to the present serving cell. The mobile communication device uses this information to periodically scan the neighbor cells for signal strength and channel conditions. The neighbor cell information is periodically transmitted to the present serving base station (312) along with the signal conditions of the present serving base station. In an intra-system handover, the base station would evaluate the present signal conditions between the mobile communication device and the base station, and if the signal conditions indicate a handover is necessary, the base station may select a target base station from among its neighbor cells within the same communication network, and commence a routine handover. However, according to the present exemplary embodiment of the invention, the base station, or other network entity, evaluates the neighbor cell information (314) and determines that signal conditions indicate a handover is needed, and that there are no intra-system cells suitable for receiving the handover, based on the measurements received from 312.

In response, according to the invention, the serving base station provides cell information of at least one nearby cell of a second communication network, such as an EV-DO system. The present serving base station may have this information as a result of an agreement between network operators, for example. It will be appreciated that, although shown here as being transmitted to the mobile communication device after the decision 314 to evaluate inter-system handover conditions, the neighbor cell information for cell of the second communication network maybe transmitted earlier, and upon making the decision 314, the base station merely commands the mobile communication device to make the evaluations at 316. To facilitate inter-system handover, the mobile communication device also provides session profile information and protocol parameters 318 to the base station for the present call. This information is necessary so that the same level of communication may be acquired on the second communication network, as required by the application in the mobile communication device.

Upon receiving the neighbor cell information for neighboring cells of the second communication network, the mobile communication device then commences measuring signal conditions 320 of the indicated neighbor cells of the second communication network. This involves reconfiguring the transceiver of the mobile communication device to receive the control signals transmitted by the base stations of the second communication network since they are operated according to a different air interface than the first communication network. The results of the measurements of the signal conditions of the bases stations of the second communication network are transmitted back to the serving base station of the first communication network (321). If at least one of the measured cells of the second communication network is deemed to be a suitable target for handover, the base station 304 will commence an inter-system handover.

The inter-system handover is performed via the MME 306. The present serving base station transmits to the MME the session profile and protocol parameters (322), which are forwarded (324) by the MME to the RNC 308 of the second communication network. The RNC and the handover candidate base station or stations evaluates the information (326) and the present resources available at the handover candidate base station or stations to determine which base station should receive the handover. Alternatively, the RNC may make a counter offer if it cannot support the request as initially specified.

Once the decision is made as to the parameters and identity of the target base station of the second communication network, the RNC transmits the information in a grant message back to the serving base station through the MME (330, 332). At the same time, the RNC may inform the target base station of the impending handover 328. The information provided by the RNC may include, for example, a unicast access terminal identifier (UATI) to be used by the mobile communication device in communicating with the second communication network; the target base station's sector ID including network address and node address; random access parameters such as access cycle duration, access preamble length, open loop adjustment, initial access probe adjustment, the number of access probes in a probe sequence, increase in power between probes, and backoff persistence probability between probe sequences; the protocol set to be used in the session, such as relevant protocol parameters like authentication key lengths; dedicated control and traffic channel parameters such as the medium access control (MAC) index assigned to the mobile communication device, the acknowledgement channel and data rate channel gain relative to the reverse pilot channel, and the data rate control cover corresponding to the target base station; and a random access required flag to indicate whether random access is required by the mobile communication device to access the target base station of the second communication network. These parameters and information are sent by the serving base station to the mobile communication device (334), and the serving base station may indicate an action time for the mobile communication device to make the switch to the indicated target base station of the second communication network.

The Random Access Required flag is determined by the target base station and RNC of the second communication network. The decision may be made based on the reverse link load on the second communication network, on the expected time interval it takes to complete the handover from the first network to the second network, or on the QoS or service level of the ongoing call.

The mobile communication device, upon receiving the information, then commences 336 an access procedure with the target base station 310 using indicated parameters, and using the air interface of the second communication network. If the random access required flag is set, the mobile communication device will first go through a random access procedure, using the random access parameters carried in the handover grant message, and after receiving acknowledgement from the target base station of the second network, switches to the assigned dedicated traffic and control channel on the second network. Otherwise, the mobile communication device will bypass the random access procedure and switch to the assigned dedicated traffic and control channel on the second network using the dedicated control and traffic channel parameters carried in the handover grant message. Upon successful admission 338 the call is successfully handed over, and the information is rerouted in the core network from the first communication network to the second communication network.

This invention can be embodied in other forms without departing from the spirit or essential attributes thereof. Accordingly, reference should be made to the following claims, rather than to the foregoing specification, as indicating the scope of the invention.

What is claimed is:

1. A method of performing call handover of a call in progress at a mobile communication device between networks having dissimilar air interfaces, comprising:
receiving from the mobile communication device at a base station of a first communication network first neighbor cell measurement, the first neighbor cell measurement performed by the mobile communication device on a neighbor cell of the base station of the first communication network;
determining, at the base station of the first communication network, that the neighbor cell measurement indicates handover to a second communication network is desirable, wherein the second communication network uses a different air interface than the first communication network;
transmitting to the mobile communication device from the base station of the first communication network a neighbor cell list including at least one neighbor cell of a second communication network;
receiving from the mobile communication device at the base station of the first communication network a session profile including session control and protocol parameters desired by the mobile communication device for the call on the second communication network;
receiving from the mobile communication device at the base station of the first communicating system a neighbor cell measurement of the at least one neighbor cell of the second communication network;
commencing a handover negotiation with a radio network access controller of the second communications network from the base station of the first communication network;
receiving from the radio access controller at the base station of the second communication network a handover grant message including a target base station identifier and connection parameters, the target base station identifier corresponding to a target base station of the second communication network; and
transmitting the target base station identifier and connection parameters to the mobile communication device;
wherein the mobile communication device uses the target base station identifier to handover to the target base station of the second communication network according to the connection parameters.

2. A method of performing call handover as defined in claim 1, wherein the first communication network is a system operated in accordance with the Evolved Universal Terrestrial Radio Access Network specification, and the second communication network is a system operated in accordance with the cdma2000 High Rate Packet Data Air Interface Specification.

3. A method of performing call handover as defined in claim 1, wherein the base station of the first network and the radio access network controller of the second network communicate through a mobility management entity.

4. A method of performing call handover as defined in claim 1, wherein commencing the handover negotiation with the radio network access controller includes sending to the radio access network controller a session profile including session control and protocol parameters used by the mobile communication device for the call.

5. A method of performing call handover as defined in claim 1, wherein upon commencing the handover negotiation, the radio access network controller selects the base station of the second network to which the call will be handed.

6. A method of performing call handover as defined in claim 1, wherein the handover grant message further includes an assigned identifier to be used by the mobile communication device.

7. A method of performing call handover as defined in claim 1, wherein the handover grant message further includes a sector identifier corresponding to a sector of the target base station.

8. A method of performing call handover as defined in claim 1, wherein the handover grant message further includes random access parameters to be used by the mobile communication device upon commencing the handover to the target base station.

9. A method of performing call handover as defined in claim 1, wherein the handover grant message further includes dedicated control and traffic channel parameters to be used by the mobile communication device upon commencing the handover to the target base station.

10. A method of performing call handover as defined in claim 1, wherein the handover grant message further includes a random access required flag to indicate whether a random access procedure is to be used by the mobile communication device upon commencing the handover to the target base station.

11. A method of performing call handover from a first communication network to a second communication network, wherein the first and second communication networks use different air interfaces, the method comprising:

receiving a handover request at a radio network controller of the second communications network from a base station of the first communication network via a mobility management entity of the first communication network, the handover request including at least one neighbor cell measurement performed by a mobile communication device operating in the first communication network of a base station of the second communication network and further including a session profile of the mobile communication device including session control and protocol parameters used by the mobile communication device for the call;

selecting, at the radio network controller, a base station of the second communication network to receive the handover based on session profile and available resources of the base station of the second communication network, generating a grant message at the radio network controller, the grant message including an identifier to be used by the mobile communication device upon handover, a target base station identifier of a target base station of the second communication network which will receive the handover, and connection parameters to be used by the mobile communication device upon connecting to the base station of the second communication network; and transmitting, from the radio network controller to the base station of the first communication network, the handover grant message;

wherein the mobile communication device uses the target base station identifier to handover to the target base station of the second communication network according to the connection parameters.

12. A method of performing call handover as defined in claim 11, wherein the first communication network is a system operated in accordance with the Evolved Universal Terrestrial Radio Access Network specification, and the second communication network is a system operated in accordance with the cdma2000 High Rate Packet Data Air Interface Specification.

13. A method of performing call handover as defined in claim 11, wherein the handover grant message further includes a sector identifier corresponding to a sector of the target base station.

14. A method of performing call handover as defined in claim 11, wherein the handover grant message further includes random access parameters to be used by the mobile communication device upon commencing the handover to the target base station.

15. A method of performing call handover as defined in claim 11, wherein the handover grant message further includes dedicated control and traffic channel parameters to be used by the mobile communication device upon commencing the handover to the target base station.

16. A method of performing call handover as defined in claim 11, wherein the handover grant message further includes a random access required flag to indicate whether a random access procedure is to be used by the mobile communication device upon commencing the handover to the target base station.

* * * * *